US009382842B2

(12) United States Patent
Carter

(10) Patent No.: US 9,382,842 B2
(45) Date of Patent: Jul. 5, 2016

(54) TURBOCHARGER ASSEMBLY

(75) Inventor: Jeffrey Carter, Mirfield (GB)

(73) Assignee: Cummins Turbo Technologies Limited, Huddersfield (GB)

(*) Notice: Subject to any disclaimer, the term of this patent is extended or adjusted under 35 U.S.C. 154(b) by 890 days.

(21) Appl. No.: 13/412,254

(22) Filed: Mar. 5, 2012

(65) Prior Publication Data

US 2012/0251352 A1    Oct. 4, 2012

(30) Foreign Application Priority Data

Mar. 4, 2011  (GB) .................................. 1103703.3

(51) Int. Cl.
| | |
|---|---|
| F02B 33/44 | (2006.01) |
| F02D 23/00 | (2006.01) |
| F02C 6/12 | (2006.01) |
| F01D 17/20 | (2006.01) |
| F02B 37/12 | (2006.01) |

(52) U.S. Cl.
CPC . *F02C 6/12* (2013.01); *F01D 17/20* (2013.01); *F02B 37/12* (2013.01); *F05D 2270/54* (2013.01); *Y02T 10/144* (2013.01)

(58) Field of Classification Search
CPC ............. F01D 17/20; F02C 6/12; F02B 37/12; F02B 37/00; F05D 2270/54; Y02T 10/144
USPC ............ 60/602, 608; 415/148, 150, 151, 157, 415/158; 123/564; 244/59, 221; 310/114; 324/166
See application file for complete search history.

(56) References Cited

U.S. PATENT DOCUMENTS

| | | | | |
|---|---|---|---|---|
| 2,471,292 | A * | 5/1949 | Taylor | 244/59 |
| 3,589,345 | A * | 6/1971 | Benson | 123/478 |
| 4,571,945 | A * | 2/1986 | Inada et al. | 60/602 |
| 4,612,900 | A * | 9/1986 | Iwata | F02P 5/1527 60/602 |
| 4,671,068 | A * | 6/1987 | Moody et al. | 60/602 |
| 4,894,991 | A * | 1/1990 | Kawamura | 60/608 |
| 5,036,669 | A * | 8/1991 | Earleson et al. | 60/602 |
| 5,701,741 | A * | 12/1997 | Halsall | 60/602 |
| 5,729,980 | A * | 3/1998 | Mackay | F02B 37/186 60/602 |
| 6,203,272 | B1 * | 3/2001 | Walsham | 415/158 |
| 6,224,021 | B1 * | 5/2001 | Tanaka | 244/221 |
| 6,272,859 | B1 * | 8/2001 | Barnes et al. | 60/602 |
| 6,435,169 | B1 | 8/2002 | Vogt | |
| 6,718,767 | B1 * | 4/2004 | Caddy | 60/602 |
| 6,768,237 | B1 * | 7/2004 | Schroedl | 310/114 |

(Continued)

FOREIGN PATENT DOCUMENTS

| | | | | |
|---|---|---|---|---|
| WO | WO 03036062 A1 * | 5/2003 | | F02B 37/24 |
| WO | 2006023689 A1 | 3/2006 | | |
| WO | WO2008020184 A1 * | 2/2008 | | F02D 41/00 |

OTHER PUBLICATIONS

United Kingdom Search Report GB1103703.3, Cummins Ltd., Jun. 10, 2011.

*Primary Examiner* — Thai Ba Trieu
(74) *Attorney, Agent, or Firm* — Taft Stettinius & Hollister LLP

(57) ABSTRACT

According to an aspect of the present invention, there is provided a turbocharger assembly, comprising: a turbocharger; one or more actuators for controlling a flow of fluid in, around, or associated with the operation of the turbocharger; control electronics for use in controlling actuation of the one or more actuators; and boost electronics configured to receive an input voltage, and to provide a boosted output voltage to the control electronics.

22 Claims, 4 Drawing Sheets

(56) References Cited

U.S. PATENT DOCUMENTS

| | | | |
|---|---|---|---|
| 6,895,751 B1* | 5/2005 | Greentree | 60/602 |
| 6,925,803 B2* | 8/2005 | Natali | 60/602 |
| 6,931,849 B2* | 8/2005 | Parker | 60/602 |
| 6,990,813 B2* | 1/2006 | Ando et al. | 60/602 |
| 7,000,392 B2* | 2/2006 | Greentree | 60/602 |
| 7,111,461 B2* | 9/2006 | Richey | 60/602 |
| 7,207,176 B2* | 4/2007 | Mulloy et al. | 60/602 |
| 7,426,829 B2* | 9/2008 | Greentree | 60/602 |
| 7,658,068 B2* | 2/2010 | Mulloy et al. | 60/602 |
| 8,105,020 B2* | 1/2012 | Bywater et al. | 415/160 |
| 8,172,516 B2* | 5/2012 | Parker et al. | 415/151 |
| 8,191,368 B2* | 6/2012 | Garrett et al. | 60/602 |
| 8,339,122 B2* | 12/2012 | Cox et al. | 324/166 |
| 2008/0047268 A1* | 2/2008 | Isogai et al. | 60/608 |
| 2009/0293477 A1* | 12/2009 | Shu | F02B 39/16 60/602 |
| 2010/0143099 A1* | 6/2010 | Bywater et al. | 415/148 |
| 2010/0275890 A1* | 11/2010 | McDonald-Walker | 123/564 |
| 2012/0121392 A1* | 5/2012 | Azuma | 415/151 |
| 2012/0299583 A1* | 11/2012 | Cox | 324/161 |
| 2013/0283782 A1* | 10/2013 | McConville | F02D 41/1454 60/602 |
| 2014/0118877 A1* | 5/2014 | Viele | H02H 9/005 361/111 |
| 2014/0121939 A1* | 5/2014 | Viele | F02D 41/20 701/102 |
| 2014/0121946 A1* | 5/2014 | Viele | F02D 41/20 701/103 |

* cited by examiner

TURBOCHARGER ASSEMBLY

CROSS REFERENCE TO RELATED APPLICATIONS

The present application claims priority to United Kingdom Application No. 1103703.3 filed Mar. 4, 2011, which is incorporated herein by reference.

BACKGROUND

The present invention relates to a turbocharger assembly, and in particular a turbocharger assembly comprising voltage boost electronics.

Turbochargers are well known devices for supplying air to the intake of an internal combustion engine at pressures above atmospheric (boost) pressure. A conventional turbocharger typically comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power.

A turbocharger assembly may comprise a turbocharger and other apparatus, for example, actuators for controlling a flow of fluid in, around, or associated with the operation of the turbocharger (or an engine system which the turbocharger assembly forms a part of). A turbocharger assembly might additionally or alternatively comprise one or more conduits that form part of, or (at least in use) are in connection with the turbocharger. The aforementioned actuators may be arranged to control a flow of fluid through those one or more conduits.

Electronics may be used in the control of one or more parts of a turbocharger assembly, for example in the control of one or more actuators of that assembly. In automotive electrical systems, a voltage applied by a typical battery may vary widely, for example from 9V to 17V for a nominally 12V battery, or for example from 18V to 34V for a nominally 24V battery. In addition, voltage supplied by the battery may suffer from transient surges in excess of the aforementioned values, for example during load dump, jump start, and/or inductive switching events.

Transient suppression circuits are typically used for preventing or limiting the transient surges mentioned above from damaging control electronics of electric actuators. Such transient suppression electronics typically are not designed to regulate a steady value of the voltage level, and instead accept the performance variation that results from the variation in supplied voltage. A few designs do attempt to regulate the supplied voltage level, and such regulation is downwards. For example, this means than an electric actuator (e.g. a motor or the like) optimised for use in connection with a 12V battery can be used in conjunction with a 24V battery system without suffering from performance variation. In other words, the voltage supplied by the 24V battery would be regulated down by the actuator control electronics (i.e. the down regulation components thereof) to a voltage suitable for use with the electric actuator (e.g. 12V).

The approach of regulating the voltage downwards has at least one associated disadvantage. A disadvantage is that if the voltage supplied to the down regulator drops below a target level (e.g. below 12V for the example provided in the previous paragraph), the regulator will be unable to maintain a constant output voltage at a desired level, and the output voltage will instead follow the input voltage downwards. This may result in degradation in performance of the actuator. In extreme situations, this may result in the actuator not functioning as intended, or in the actuator not functioning at all. A low voltage applied to the actuator may alternatively or additionally limit the available power or torque density (e.g. for example if the actuator is a motor or the like), and this may result in the actuator not being able to perform a certain function.

It is an object of the present Invention to provide a turbocharger assembly which at least partially obviates or mitigates a disadvantage of the prior art, whether identified herein or elsewhere, or which provides an alternative to an existing or proposed turbocharger assembly.

BRIEF SUMMARY

According to an aspect of the present invention, there is provided a turbocharger assembly, comprising: a turbocharger; one or more actuators for controlling a flow of fluid in, around, or associated with the operation of the turbocharger; control electronics for use in controlling actuation of the one or more actuators; and boost electronics configured to receive an input voltage, and to provide a boosted output voltage to the control electronics.

Each actuator may be in connection with dedicated control electronics for use in controlling only that actuator, and each dedicated control electronics may be in connection with dedicated boost electronics for use in providing a boosted output voltage to only that dedicated control electronics.

Any reference herein to 'control electronics' or 'boost electronics' may, where appropriate, include 'dedicated control electronics' or 'dedicated boost electronics'.

The control electronics and the boost electronics may be located within a single housing. The housing may additionally house at least a part of the actuator that is to be controlled by the control electronics.

The control electronics and the boost electronics may be located or provided on the same circuit board.

The boost electronics may be configured to boost a received input voltage and to provide a boosted output voltage that is sufficient for acceptable or optimal operation of the one or more actuators.

The boost electronics may be configured to boost a received input voltage and to provide a boosted output voltage that is substantially equal to, or less than, (what is known in the art or field as) an extra-low voltage, such as 120V.

The input voltage and/or the boosted output voltage is a DC voltage, frequently (if not always) used in engine control electronics.

The turbocharger assembly may also comprise one or more conduits that form part of, or are in connection with, the turbocharger, and wherein the one or more actuators are arranged to control a flow of fluid through the one or more conduits.

The turbocharger of the assembly may comprise a turbine, and the one or more actuators may be suitable for controlling a flow of fluid in to, out of, around, or generally associated with the operation of that turbine. In an example, the one or more actuators may be one or more of: a wastegate actuator for that turbine, and/or an actuator for varying a geometry of an inlet to, or an inlet of, the turbine. One or more of the actuators may be a valve or the like used to regulate and/or direct flow to one or more turbochargers in multi-stage turbocharger systems.

The turbocharger of the assembly may comprise a turbine wheel and a compressor wheel, both mounted to a rotor shaft that defines a turbocharger axis, the turbine wheel being mounted within a housing, the housing defining a gas flow inlet passage upstream of the turbine wheel. In an example, the turbocharger may be a variable geometry turbocharger comprising a member that is movable (e.g. to change its position and/or orientation) to vary a geometry of that turbocharger. In an example, the member may be an annular wall member defining a wall of the inlet passage and which is movable in a direction substantially parallel to the turbocharger axis to control gas flow through the inlet passage. In another example, the member may be one or more movable vanes or movable flow guides for guiding the direction of flow of fluid entering the turbine. In an example, at least one of the one or more actuators may be configured to move the member.

The one or more actuators may be one or more electric actuators (e.g. electrically driven or powered actuators, as opposed to, for example, a purely pneumatic actuator).

BRIEF DESCRIPTION OF THE DRAWINGS

Other advantageous and preferred features of the invention will be apparent from the following description.

Specific embodiments of the present invention will now be described, by way of example only, with reference to the accompanying Figures, in which.

DETAILED DESCRIPTION OF THE ILLUSTRATED EMBODIMENTS

Figure 1:
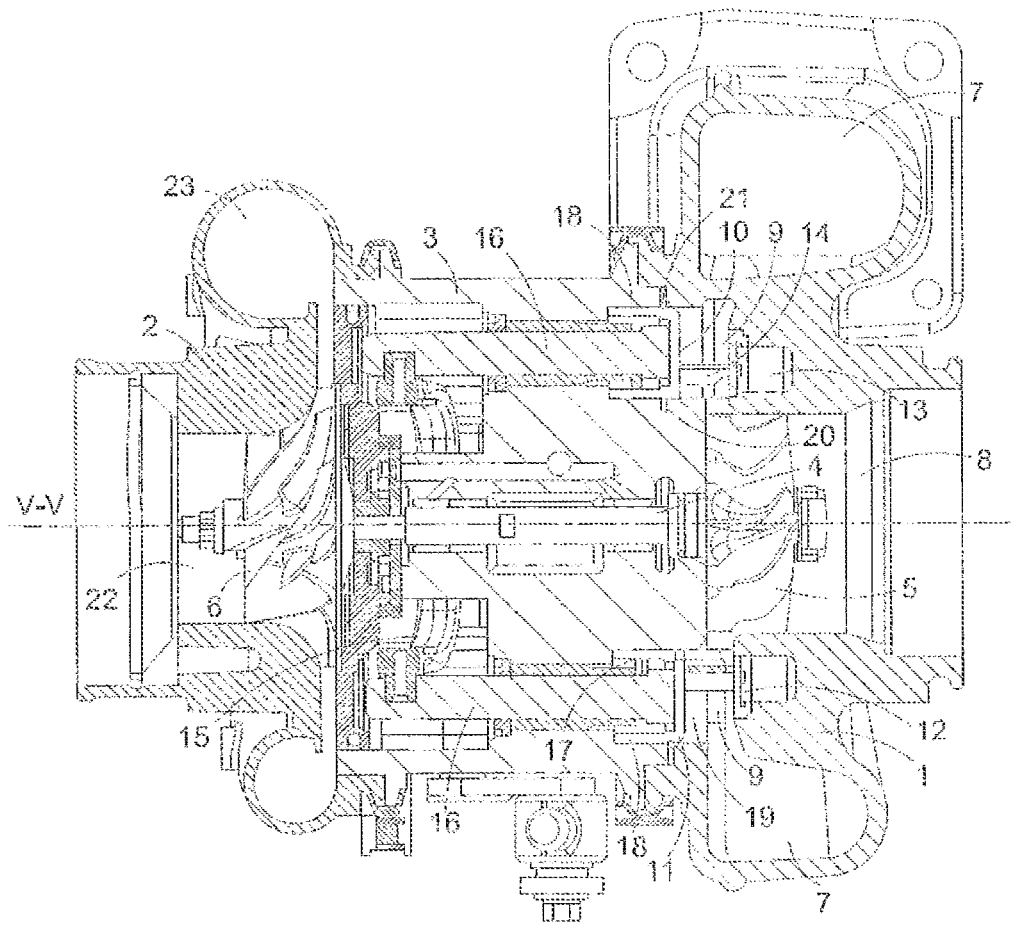
FIG. 1 schematically depicts an axial cross-section through a variable geometry turbocharger.

FIG. 1 illustrates a variable geometry turbocharger comprising a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about turbocharger axis V-V on bearing assemblies located in the bearing housing 3.

The turbine housing 1 defines an inlet volute 7 to which gas from an internal combustion engine (not shown) is delivered, for example via one or more conduits (not shown). The exhaust gas flows from the inlet chamber 7 to an axial outlet passageway 8 via an annular inlet passageway 9 and turbine wheel 5. The inlet passageway 9 is defined on one side by the face 10 of a radial wall of a movable annular wall member 11, commonly referred to as a "nozzle ring", and on the opposite side by an annular shroud 12 which forms the wall of the inlet passageway 9 facing the nozzle ring 11. The shroud 12 covers the opening of an annular recess 13 in the turbine housing 1.

The nozzle ring 11 supports an array of circumferentially and equally spaced inlet vanes 14 each of which extends across the inlet passageway 9. The vanes 14 are orientated to deflect gas flowing through the inlet passageway 9 towards the direction of rotation of the turbine wheel 5. When the nozzle ring 11 is proximate to the annular shroud 12, the vanes 14 project through suitably configured slots in the shroud 12, into the recess 13. In another embodiment (not shown), the wall of the inlet passageway may be provided with the vanes, and the nozzle ring provided with the recess and shroud.

The position of the nozzle ring 11 is controlled by an actuator assembly, for example an actuator assembly of the type disclosed in U.S. Pat. No. 5,868,552. An actuator (not shown) is operable to adjust the position of the nozzle ring 11 via an actuator output shaft (not shown), which is linked to a yoke 15. The yoke 15 in turn engages axially extending movable rods 16 that support the nozzle ring 11. Accordingly, by appropriate control of the actuator (which may for instance be pneumatic or electric), the axial position of the rods 16 and thus of the nozzle ring 11 can be controlled.

The nozzle ring 11 has axially extending radially inner and outer annular flanges 17 and 18 that extend into an annular cavity 19 provided in the turbine housing 1. Inner and outer sealing rings 20 and 21 are provided to seal the nozzle ring 11 with respect to inner and outer annular surfaces of the annular cavity 19 respectively, whilst allowing the nozzle ring 11 to slide within the annular cavity 19. The inner sealing ring 20 is supported within an annular groove formed in the radially inner annular surface of the cavity 19 and bears against the inner annular flange 17 of the nozzle ring 11. The outer sealing ring 20 is supported within an annular groove formed in the radially outer annular surface of the cavity 19 and bears against the outer annular flange 18 of the nozzle ring 11.

Gas flowing from the inlet chamber 7 to the outlet passageway 8 passes over the turbine wheel 5 and as a result torque is applied to the shaft 4 to drive the compressor wheel 6. Rotation of the compressor wheel 6 within the compressor housing 2 pressurises ambient air present, in an air inlet 22 and delivers the pressurised air to an air outlet volute 23 from which it is fed to an internal combustion engine (not shown), for example via one or more conduits (not shown). The speed of the turbine wheel 5 is dependent upon the velocity of the gas passing through the annular inlet passageway 9. For a fixed rate of mass of gas flowing into the inlet passageway, the gas velocity is a function of the width of the inlet passageway 9, the width being adjustable by controlling the axial position of the nozzle ring 11. FIG. 1 shows the annular inlet passageway 9 fully open. The inlet passageway 9 may be closed to a minimum by moving the face 10 of the nozzle ring 11 towards the shroud 12.

As discussed above, the nozzle ring 11 may be moved by an actuator. If the actuator is an electric actuator, the actuator will be powered by or via a power source included within, or in connection with, the apparatus of which the turbocharger forms a part (e.g. an engine system). Operation of the actuator, and thus positioning of the nozzle ring 11, relies upon the appropriate supply of electrical power, and in particular an appropriate voltage, to control electronics of the actuator. If the voltage is insufficient, the control electronics may not be able to satisfactorily control the actuator and thus the position or orientation of a member associated with (e.g. in connection with) that actuator.

A reduction or dip in the voltage that is supplied to the control electronics may occur, for example, during start-up of an engine, when the engine is operating at a low speed, or when one or more other electrical loads are placed on the power supply. When the engine is operating at high speed, the voltage provided by the power supply may be sufficiently high for most if not all needs. For example, the engine may be running an alternator which would be used to generate a sufficiently high output voltage, particularly at high engine speeds. Actuators that need to be used at high engine speeds, for example wastegate actuators sometimes used in a turbocharger, may thus not suffer from the reduced voltage problems discussed above, or at least not as frequently as actuators used at or during zero or low engine speeds. Actuators used at low engine speeds may include the nozzle ring 11 discussed above or, generically, a movable member of a turbocharger, that may be movable to vary the geometry of a turbocharger. Such a member may need to be moved even before the engine is started (e.g. at 'key on', prior to ignition), at which points a lower than required voltage supply is more likely.

Figure 2:
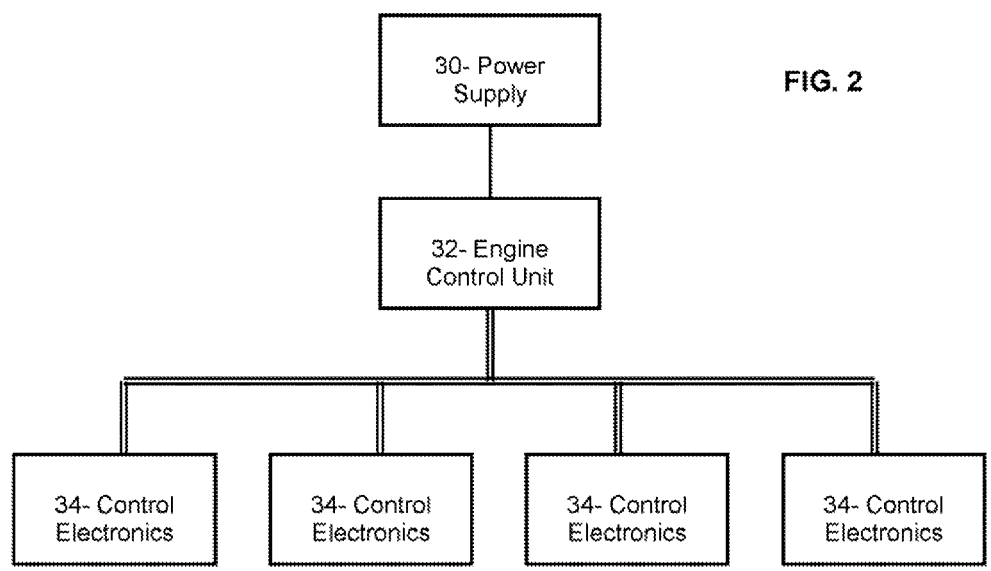
FIG. 2 schematically depicts an example of electronics associated with a turbocharger assembly.

FIG. 2 schematically depicts an approach to obviating or mitigating the problems discussed above. FIG. 2 schematically depicts an engine system having a power supply 30, for example a battery or the like. The power supply 30 is in electrical connection with an engine control unit or engine management unit or the like 32. The engine control unit 32 comprises boost electronics configured to receive an input voltage from the power supply 30 and to provide a boosted output voltage. The term 'boost electronics' as used herein encompasses electronics that, in functional terms, are able to receive an input voltage, and to provide a boosted (e.g. higher) output voltage, and may for example encompass the terms, or electronics such as 'boost converter', 'boost regulator', and variations thereon, as known in the art of electronics.

The control unit 32 is in electrical connection with a plurality of control electronics 34, for example control electronics 34 for use in controlling actuation of one or more actuators of the engine system (not shown). The boost electronics of the control unit 32 are configured to provide a boosted output voltage that is sufficient for the control electronics 34 to adequately control there respective actuators (or the like) under, for example, most or all operating conditions. Thus, even if, and for whatever reason, the voltage provided by the power supply 30 temporarily decreases below a level that would otherwise be sufficient to control the actuators, the boost electronics in the control unit 32 boost that voltage to ensure that the actuators' performance is as required and as expected.

In one example, the electronics shown in FIG. 2 may be electronics for use in controlling a turbocharger, and/or actuators used in conjunction with that turbocharger. The incorporation and use of the boost electronics obviates or mitigates the problems discussed above. Although the electronics, and in particular boost electronics, as shown in and described with reference to FIG. 2 may obviate or mitigate one or more problems of the prior art, the arrangement as a whole still has associated disadvantages.

One disadvantage is the global, or in other words centralised, boosting of the voltage provided by the power supply. Such global or centralised boosting of the voltage would, in practice, most likely require an additional voltage bus with associated harnessing travelling and/or extending around the engine system. This may add to the installation cost of such electronics, and the additional voltage bus extending around the engine may provide more failure points for the electronics or associated wiring.

Another disadvantage is that not all electric actuators used in conjunction with an engine or a turbocharger thereof may be performance critical. Therefore, not all of the electric actuators may require the boosted voltage. There may thus be a potential installation and maintenance cost advantage in boosting voltage applied to electronics of actuators requiring that boosted voltage.

A further disadvantage is related to the modularity of a typical engine system and its impact on the implementation of boost electronics. For instance, whereas one manufacturer may design, manufacture and provide an engine control unit, or the power supply for an engine, another completely separate manufacturer or company may manufacture and provide another component or module, such as for example a turbocharger or turbocharger assembly. In practice, the manufacturer of one component or module may not be able to request or impose design restraints or operational conditions on the manufacturer or the like of another component or module. In one example, the manufacturer of the turbocharger may not be able to request that the electrical power supply of the engine as a whole comprises global boost electronics, or boost electronics for dedicated solely to that turbocharger.

In accordance with the present invention, a holistic view has been taken of the problems associated with power supply systems within engine systems or the like, and potential but still not ideal solutions to these problems (as for example shown in and described with reference to FIG. 2 above). In accordance with the present invention, it has been found that, perhaps surprisingly, the problems discussed above can be at least partially overcome by de-centralising, and thus localising, the provision of a boost voltage for the actuator or actuators that actually require that boost voltage.

According to the present invention, there is provided a turbocharger assembly. The turbocharger assembly comprises a turbocharger. The turbocharger will typically include a turbine. Alternatively or additionally, the turbocharger may typically comprise a turbine wheel and a compressor wheel, both mounted to a rotor/turbocharger shaft that defines a turbocharger axis. The turbine wheel is mounted within a housing, the housing defining a gas flow inlet passage upstream of the turbine wheel. The turbocharger may be a variable geometry turbocharger comprising a member that is movable to vary a geometry of that turbocharger, for example a geometry of a gas flow inlet. As discussed above in relation to FIG. 1, the member may be an annular wall member defining a wall of the inlet passage, and which is movable in a direction substantially parallel to the turbocharger axis to control gas flow through the inlet passage.

The turbocharger assembly further comprises one or more actuators for controlling a flow of fluid in, around, or associated with the operation of the turbocharger. The one or more actuators may be configured to displace (e.g. change the position or orientation of) the member discussed previously—e.g. a member that is movable to vary the geometry of the variable geometry turbocharger. For instance, the actuator may be a wastegate actuator. In another example, the actuator may be an actuator for varying a geometry of an inlet to, or an Inlet of, a turbine of the turbocharger. As already discussed above, an actuator for varying a geometry of an inlet to a turbine may be more susceptible to a voltage supply that is too low, and thus the present invention may be more particularly suited to use in conjunction with an actuator for varying a geometry of the turbocharger (e. g. a turbine of that turbocharger).

The turbocharger assembly further comprises control electronics for use in controlling actuation of the one or more actuators. For example, such control electronics may be driving electronics for controlling the position of one or more members of the actuator, or the actuator itself, or varying a position, orientation or degree of extension of the actuator or constituent numbers of the actuator. There is further provided boost electronics configured to receive an input voltage (e.g. from a power supply, such as a battery and/or alternator or the like), and to provide a boosted output voltage to the control electronics. The boost electronics are used to provide a boosted voltage in a more localised and de-centralised manner than as discussed above in relation to FIG. 2. In particular, the boost electronics are associated with the turbocharger assembly alone. In some preferred embodiments, the boost electronics are associated with only a limited number of actuators of that assembly, and in an even more preferred embodiment, with only a single actuator of that turbocharger assembly.

The advantages of localising the provision of the boost voltage are numerous. The localising of the boosted voltage and thus boost electronics does not require a (or an additional) voltage bus extending and travelling around the engine from the power supply to the turbocharger. There may be cost and reliability advantages associated with avoiding the need for this. Furthermore, only those actuator control electronics for which a boosted voltage is required need to be supplied with that boosted voltage. There may be cost advantages in boosting the voltage to only actuator electronics that require that boosted voltage. Furthermore, by localising the boosted voltage and associated electronics to the turbocharger assembly, a more modular approach is realised. For instance, the manufacturer of the turbocharger assembly may also provide the boost electronics, meaning that there is no impact or interference with the manufacturer or designer of, for example, the quite separate power supply apparatus of an engine system in which the turbocharger assembly is to be used.

Figure 3:
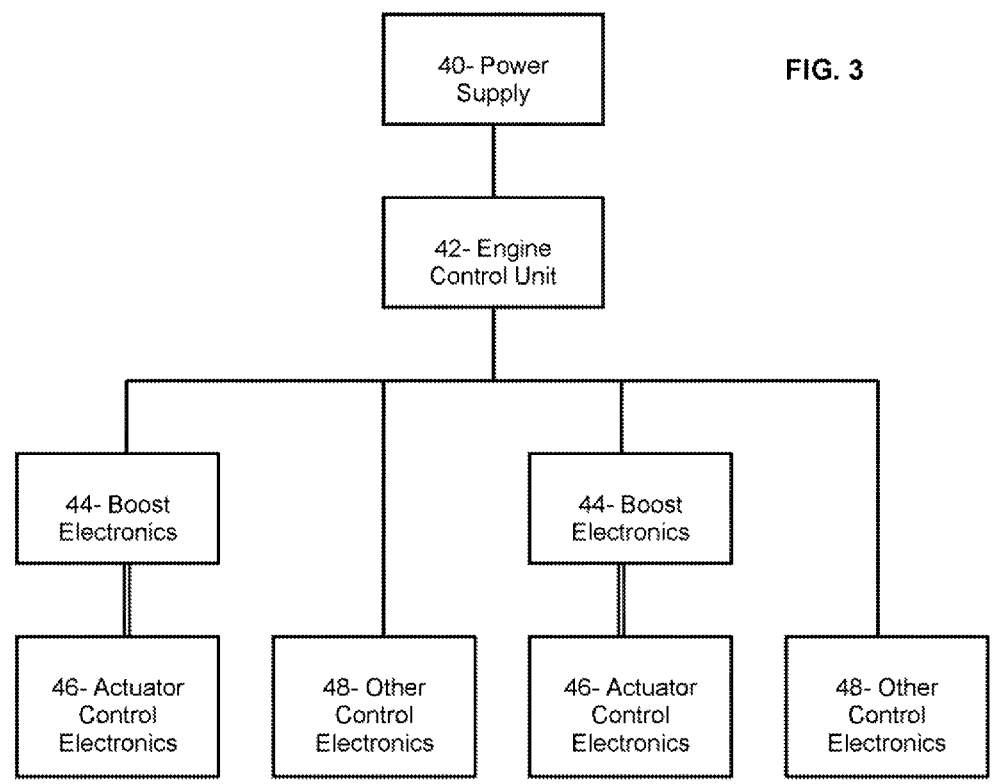
FIG. 3 schematically depicts electronics associated with a turbocharger assembly, in accordance with an embodiment of the present invention.

FIG. 3 schematically depicts the concept of localising the provision of the boost voltage, and thus localising the provision of boost electronics, in an engine system. In particular, FIG. 3 schematically depicts a power supply 40, which may for example comprise a battery and/or an alternator. The power supply 40 is in electrical connection with an engine control unit or engine management unit or the like 42. In stark contrast with the arrangement shown in FIG. 2, where the engine control unit comprised boost electronics for (globally) boosting the voltage supplied to actuator control electronics, the engine control unit 42 of FIG. 3 does not (necessarily) comprise boost electronics for boosting the voltage supplied to actuator control electronics. Instead, in FIG. 3 boost electronics 44 are provided in a de-centralised and thus more localised manner. In particular, the boost electronics 44 are provided where a boosted voltage is required, for example in the supply of a boosted voltage to particular control electronics 46 for particular actuators. These actuators may be, for example, performance critical actuators, or actuators which are more likely to suffer from inadequate performance during dips or lulls in an otherwise satisfactory power supply (e.g. actuators used at low engine speeds). Other control electronics 48 for actuators which do not require the boosted voltage are not provided with this boosted voltage, but may instead be provided with the voltage directly supplied by the power supply 40 via the engine control unit 42.

It has previously been the accepted position of those skilled in the field that any regulation of a voltage supply in an engine or the like would be undertaken globally, and in a central manner, as for instance schematically depicted and described with reference to FIG. 2. Once the problems and/or disadvantages associated with such global and centralised voltage boosting have been determined, the simple and elegant solution of localising the voltage boosting and the associated electronics has become apparent to the inventor, and is thus the subject of this invention.

Figure 4:
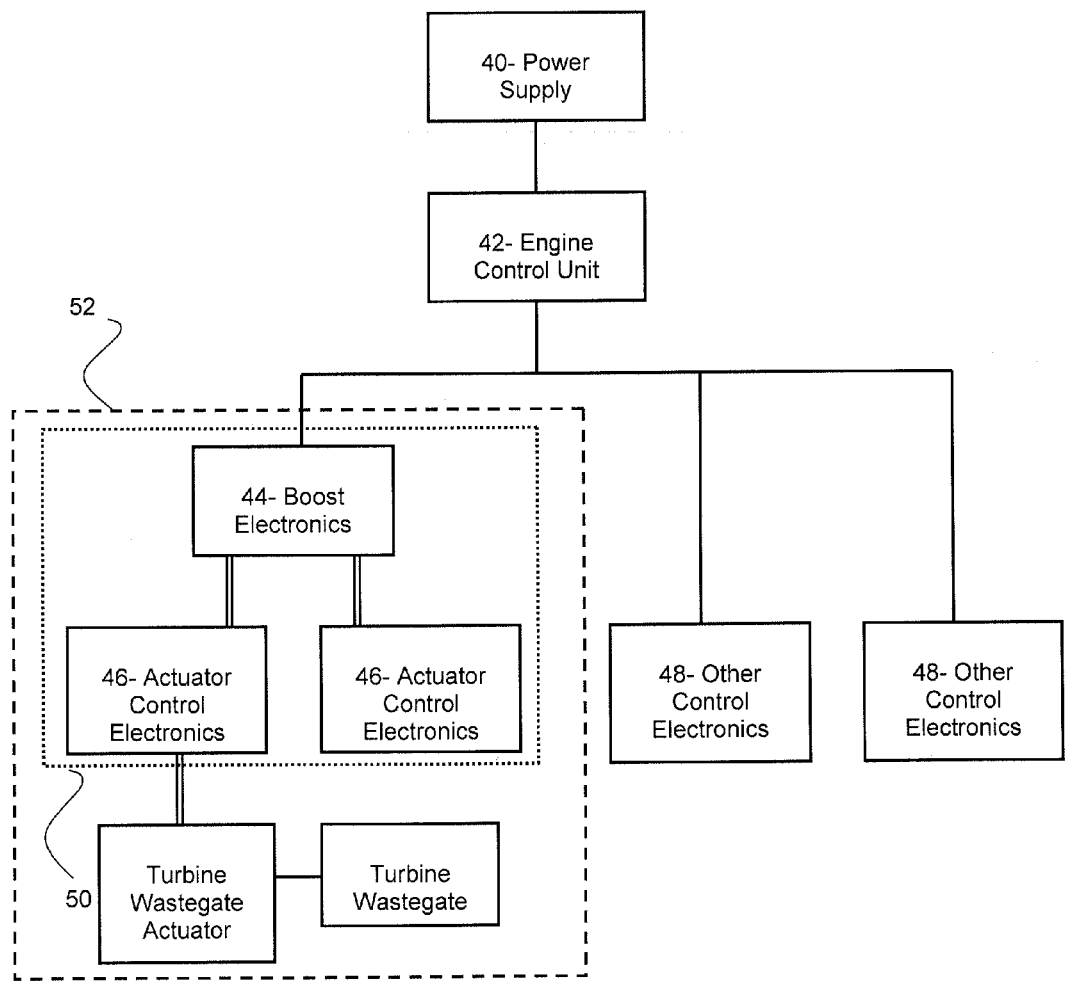
FIG. 4 schematically depicts electronics associated with a turbocharger assembly, in accordance with another embodiment of the present invention.

FIG. 4 shows a more specific example of the arrangement already shown in and described with reference to FIG. 3. In FIG. 4, a single set of localised boost electronics 44 is used to boost the supply of voltage to a plurality of actuator control electronics 46, in this case for two such actuator control electronics 46. The control electronics 46 and the boost electronics 44 may be located within a single housing and/or be provided on or located on the same circuit board, generically denoted in FIG. 4 by box 50. If located within the same, single housing, the housing may additionally house at least a part of the actuator, or the housing of the actuator may also house the control electronics and boost electronics. Being located within the same housing, or on the same circuit board, may make reduce costs, or make it easier to protect the electronics from the environment.

The arrangement shown in FIG. 4 may schematically depict a power supply system of an engine system. Part of that engine system may comprise a turbocharger, generically denoted by box 52 in FIG. 4. As discussed above, the boosted voltage may be required to power a wastegate actuator, or an actuator for a variable geometry configuration of (e.g. a turbine of) the turbocharger 52.

Figure 5:
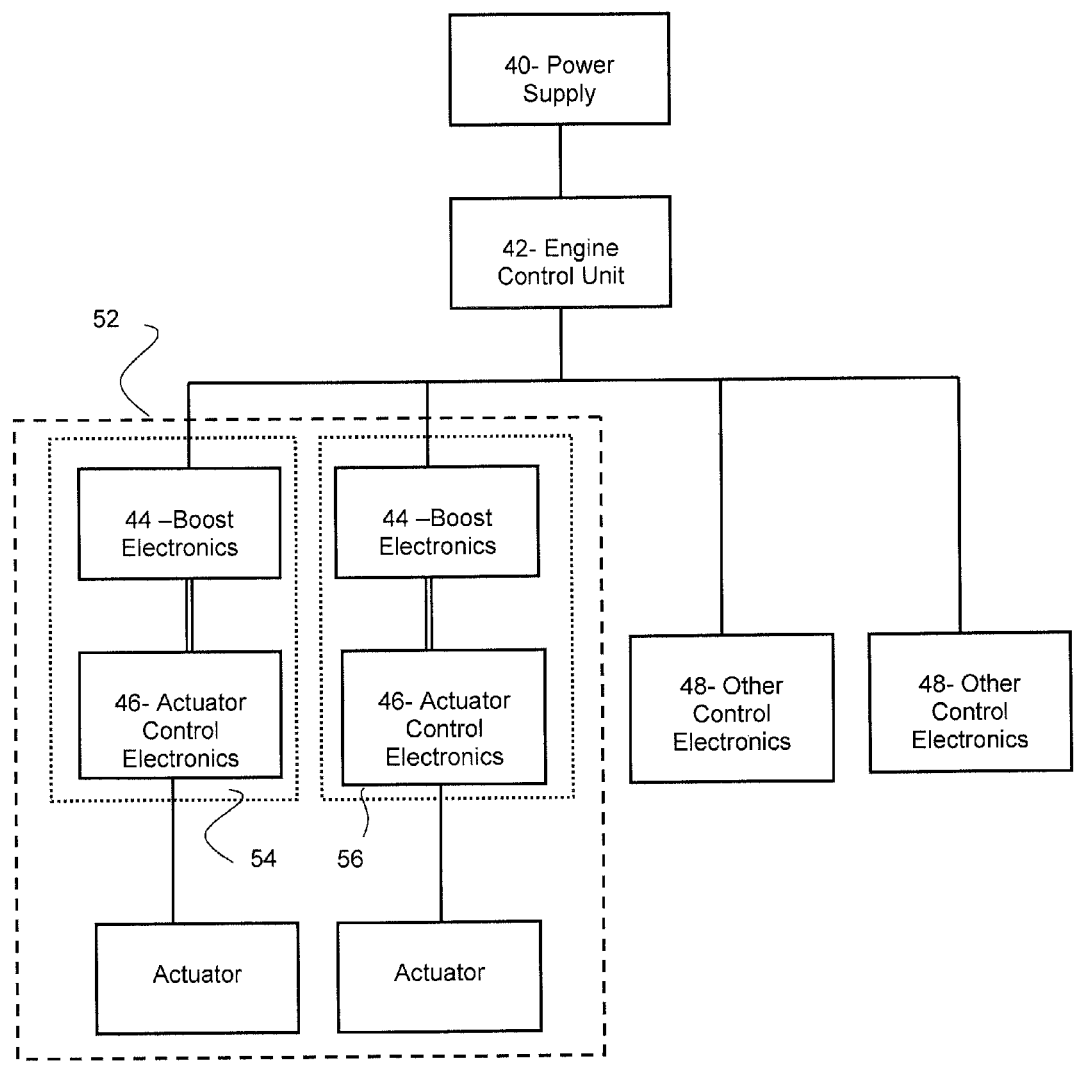
FIG. 5 schematically depicts electronics associated with a turbocharger assembly, in accordance with yet another embodiment of the preset invention.

FIG. 5 shows that, in a preferred embodiment, an actuator may be in connection with (which includes comprise) dedicated control electronics 46 for use in controlling only that particular actuator. Each dedicated control electronics 46 is in connection with dedicated boost electronics 44 for use in providing a boosted output voltage to only that dedicated control electronics 46. This embodiment may therefore be viewed as the full localisation of the boost voltage and associated boost electronics 44. The boost electronics 44 and control electronics 46 may, again, be located in a single, independent housing 54, 56, or be located or provided on a single circuit board 54, 56. The housing 54, 56 may be a housing of the actuator that is been controlled by the respective control electronics 46. This embodiment may be particularly preferable, since the boost electronics 44 and control electronics 46 may be formed with the actuator, or within the same housing as the actuator, allowing the actuator to be truly modular. This may provide cost savings, maintenance benefits or the like.

The boost electronics referred to above will be configured to receive and input voltage and to provide a boosted output voltage that is sufficient for acceptable or optimal operation of the one or more actuators that are being controlled. That boosted voltage may be, for example, an expected, a typical, or a rated maximum, peak, or root mean square output of the power supply, which may be a battery, an alternator, or a combination of a battery and an alternator or the like. The boosted voltage may be substantially equal to, or less than, what is know in the art as an extra-low voltage (ELV), such as for example substantially equal to or less than 120V. An advantage of boosting the voltage within ELV requirements is that circuit insulation and protection requirements may be reduced, and may therefore cheaper, in comparison with higher voltage systems. The voltages discussed herein will usually refer to DC voltages, which are usually used in the power supplies and the like of engine systems.

A turbocharger assembly has been discussed above. The turbocharger assembly has been discussed as comprising a turbocharger, and one or more actuators for use in controlling a flow of fluid in, around, or associated with the operation of a turbocharger (e.g. exhaust gases, or air, or the like). The turbocharger assembly may additionally comprise one or more conduits that form part of, or are (in use) in connection with the turbocharger. The one or more actuators discussed above may be arranged to (in addition to, or alternatively to, controlling the flow of fluid associated with the turbocharger) be arranged to control a flow of fluid through the one or more conduits. For example, the conduits may be pipes or the like linking the turbocharger to other components of the engine system.

The present invention may be particularly suited to turbochargers having one or more actuators, due to the need to control those one or more actuators. Other components of an engine system are unlikely to have actuators of the type used in a turbocharger, and are thus less likely to experience the same problems associated with low voltage supply, as overcome by the present invention. Furthermore, turbochargers are particularly required to function at key-on, where engine speed is zero and where, without the present invention, a power supply may be too low to operate (or adequately operate) an actuator of the turbocharger. The turbocharger may be required to function at key on for the following reasons:

1) The turbocharger is a device that can affect engine emissions, and so the engine control unit may be required to check that the turbocharger is functional, and a common method of doing this is to exercise the turbocharger actuator at key-on.

2) The turbocharger can aid engine warm-up by being set at or near to a closed turbine position at key on, thereby providing a back pressure to the engine and increasing engine pumping work. In this way, the turbocharger can be used to reduce white smoke produced by a diesel engine during cold starting conditions.

3) Many electric actuators use relative step-counting rather than absolute position sensing, and so must find a position reference at key on. This is typically accomplished by moving the actuator until it cannot move further. At this point it is assumed to be at the end of its stroke. It the turbocharger has high friction (often the case at cold start conditions), and the actuator has low performance because the supply voltage is limited, the actuator or its electronics may be unable to overcome the friction and wrongly assume it is at the end of its stroke. If this occurs, the actuator position will be in error and may cause the engine to fail to meet expected performance and/or emissions requirements.

Furthermore, turbochargers, and particularly the sliding wall member variety of variable geometry turbochargers, need to have an actuator that is capable of providing a relatively high torque whilst requiring good dynamic response. The actuator must thus be capable of delivering a high power compared to other engine control valves external to the turbocharger, such as an intake throttle or the like. Given that actuator motor windings (or the like), wiring harnessing and connector contacts may impose some practical minimum of electrical resistance, it can often be difficult to deliver the required electrical power in a low voltage system. The present invention may overcome this problem, The invention has been described in relation to a turbocharger assembly comprising a single turbocharger. In another embodiment, the turbocharger assembly may comprise more than one turbocharger, for example a multi-stage turbocharger system. In such a multi-stage system, one or more of the actuators discussed above may be a valve or the like used to regulate and/or direct flow to one or more turbochargers in a multi-stage turbocharger system.

The exact nature of the boost electronics (e.g. circuit components and/or layouts) has not been described herein, since the exact nature of the boost electronics is not the nature of the invention. Instead, the invention relates to the localised use of such electronics in a turbocharger assembly. Examples of typical and readily applicable voltage boost electronics are readily identifiable in the field of electronics, and applicable to this invention.

Other possible modifications to the detailed structure of the illustrated embodiments of the invention will be readily apparent to the appropriately skilled person after assessment of the provided description, claims and Figures. Various modifications may be made to the embodiments of the invention described above, without departing from the present invention as defined by the claims that follow.

The invention claimed is:

1. A turbocharger assembly, comprising:
   a turbocharger;
   one or more actuators for controlling a flow of fluid;
   control electronics for use in controlling actuation of the one or more actuators; and
   boost electronics configured to receive an input voltage, and to provide a boosted output voltage to the control electronics;
      wherein the turbocharger comprises a turbine comprising a turbine wheel;
   and the one or more actuators is suitable for controlling the flow of fluid relative to the turbine wheel.

2. The turbocharger assembly of claim 1, wherein:
   each actuator is in connection with dedicated control electronics for use in controlling only that actuator; and
   each dedicated control electronics is in connection with dedicated boost electronics for use in providing a boosted output voltage to only that dedicated control electronics.

3. The turbocharger assembly of claim 1, wherein the control electronics and the boost electronics are located within a single housing.

4. The turbocharger assembly of claim 1, wherein the control electronics and the boost electronics are located or provided on the same circuit board.

5. The turbocharger assembly of claim 1, wherein the boost electronics is configured to boost a received input voltage and to provide a boosted output voltage that is sufficient for operation of the one or more actuators.

6. The turbocharger assembly of claim 1, wherein the boost electronics is configured to boost a received input voltage and to provide a boosted output voltage that is substantially equal to, or less than, 120V.

7. The turbocharger assembly of claim 1, wherein the input voltage or the boosted output voltage is a DC voltage.

8. The turbocharger assembly of claim 1, wherein the turbocharger assembly comprises one or more conduits that form part of, or are in connection with, the turbocharger, and wherein the one or more actuators are arranged to control a flow of fluid through the one or more conduits.

9. The turbocharger assembly of claim 1, wherein the one or more actuators is one or more of: a wastegate actuator or an actuator for varying a geometry of an inlet to or an inlet of, the turbine.

10. The turbocharger assembly of claim 1, wherein the turbine wheel is mounted to a rotor shaft that defines a turbocharger axis and the turbocharger comprises a compressor wheel mounted to the rotor shaft, the turbine wheel being mounted within a housing, the housing defining a gas flow inlet passage upstream of the turbine wheel.

11. The turbocharger assembly of claim 10, wherein the turbocharger is a variable geometry turbocharger.

12. The turbocharger assembly of claim 11, wherein the variable geometry turbocharger comprises an annular wall defining a wall of the inlet passage and which is moveable in a direction substantially parallel to the turbocharger axis to control gas flow through the inlet passage.

13. The turbocharger assembly of claim 12, wherein the annular wall is a nozzle ring provided with an array of inlet vanes or a nozzle ring or shroud provided with a plurality of slots for receiving inlet vanes.

14. The turbocharger assembly of claim 11, wherein at least one of the one or more actuators is configured to vary the geometry of the turbocharger.

15. The turbocharger assembly of claim 11, wherein the variable geometry turbocharger comprises a movable vane, moveable flow guide, or a turbine wastegate and at least one of the one or more actuators is configured to move the movable vane, movable flow guide, or turbine wastegate.

16. The turbocharger assembly of claim 1, wherein the one or more actuators are one or more electric actuators.

17. The turbocharger assembly of claim 1, wherein the turbocharger is a variable geometry turbocharger comprising a member that is movable to vary a geometry of that turbocharger and wherein at least one of the one or more actuators is configured to move the member to vary the geometry of the turbocharger.

18. The turbocharger assembly of claim 1, wherein the input voltage and the boosted output voltage is a DC voltage.

19. The turbocharger assembly of claim 1, wherein:
the turbocharger assembly comprises a plurality of said actuators and
each actuator is in connection with dedicated control electronics for use in controlling only that actuator; and
each dedicated control electronics is in connection with dedicated boost electronics for use in providing a boosted output voltage to only that dedicated control electronics.

20. The turbocharger assembly of claim 1, wherein the boost electronics is configured to receive the input voltage, and to provide the boosted output voltage to the control electronics such that if the input voltage is below a threshold level the boosted electronics is configured to boost the input voltage so that the boosted output voltage is higher than the input voltage.

21. A turbocharger assembly, comprising:
a turbocharger;
one or more actuators for controlling a flow of fluid;
control electronics for use in controlling actuation of the one or more actuators;
boost electronics configured to receive an input voltage, and to provide a boosted output voltage to the control electronics;
wherein the turbocharger comprises a turbine comprising a turbine wheel;
the one or more actuators is suitable for controlling the flow of fluid relative to the turbine wheel; and
the one or more actuators is one or more of: a wastegate actuator or an actuator for varying a geometry of an inlet to, or an inlet of, the turbine.

22. The turbocharger assembly of claim 21, wherein the boost electronics is configured to receive the input voltage, and to provide the boosted output voltage to the control electronics such that if the input voltage is below a threshold level the boosted electronics is configured to boost the input voltage so that the boosted output voltage is higher than the input voltage.

* * * * *